United States Patent
Ramachandra (10) Patent No.: US 8,996,995 B2
(45) Date of Patent: Mar. 31, 2015

(54) METHOD AND APPARATUS FOR PHRASE REPLACEMENT

(75) Inventor: Sushma Ramachandra, Bangalore (IN)

(73) Assignee: Nokia Corporation, Espoo (FI)

( * ) Notice: Subject to any disclaimer, the term of this patent is extended or adjusted under 35 U.S.C. 154(b) by 116 days.

(21) Appl. No.: 13/203,308

(22) PCT Filed: Feb. 16, 2010

(86) PCT No.: PCT/EP2010/000932
§ 371 (c)(1),
(2), (4) Date: Dec. 7, 2011

(87) PCT Pub. No.: WO2010/097171
PCT Pub. Date: Sep. 2, 2010

(65) Prior Publication Data
US 2012/0072838 A1    Mar. 22, 2012

(30) Foreign Application Priority Data
Feb. 25, 2009    (IN) ............................. 357/DEL/2009

(51) Int. Cl.
*G06F 17/27* (2006.01)
*G06F 3/023* (2006.01)
*G06F 3/0488* (2013.01)

(52) U.S. Cl.
CPC .......... *G06F 3/0237* (2013.01); *G06F 3/04883* (2013.01); *G06F 17/276* (2013.01); *G06F 2203/04808* (2013.01)
USPC ........................... 715/271; 715/261; 715/863

(58) Field of Classification Search
USPC ........................................ 715/261, 271, 863
See application file for complete search history.

(56) References Cited

U.S. PATENT DOCUMENTS

| 5,579,469 | A   | * | 11/1996 | Pike .............................. 715/781 |
| 6,279,018 | B1  | * | 8/2001  | Kudrolli et al. ............... 715/234 |
| 8,650,507 | B2  | * | 2/2014  | Westerman et al. .......... 715/863 |
| 2003/0159113 | A1 |   | 8/2003 | Bederson et al. |
| 2005/0180633 | A1 |   | 8/2005 | Williamson et al. |
| 2006/0075353 | A1 | * | 4/2006 | DeSpain et al. .............. 715/770 |
| 2008/0005703 | A1 | * | 1/2008 | Radivojevic et al. ......... 715/863 |
| 2008/0109744 | A1 | * | 5/2008 | Ozzie et al. ................... 715/770 |
| 2008/0316183 | A1 | * | 12/2008 | Westerman et al. .......... 345/173 |
| 2010/0031202 | A1 | * | 2/2010 | Morris et al. ................. 715/863 |
| 2010/0134425 | A1 | * | 6/2010 | Storrusten ..................... 345/173 |
| 2012/0011462 | A1 | * | 1/2012 | Westerman et al. .......... 715/773 |

FOREIGN PATENT DOCUMENTS

WO    WO 2007/079425  A2    7/2007

OTHER PUBLICATIONS

Sciamma; ClipAssist 2.0; 2005; Inventors Emporium; pp. 1-3.*
Newton Apple MessagePad Handbook; 1995; Apple Computer, Inc.; pp. 1-358.*

(Continued)

*Primary Examiner* — Andrew Dyer
(74) *Attorney, Agent, or Firm* — Alston & Bird LLP (57) ABSTRACT

An apparatus comprising a controller, wherein said controller is arranged to receive touch input identifying an original string; receive a multi-touch input gesture comprising a first and a second touch point in which a distance between a first touch point and a second touch point is changed and to replace said identified original string with a replacement string in response thereto.

13 Claims, 5 Drawing Sheets

(56) References Cited

OTHER PUBLICATIONS

"Edit;" Microsoft Computer Dictionary; May 1, 2002; Microsoft Press; Fifth Edition; p. 234.*

Suggest; Feb. 20, 2010; Merriam-Webster.com; pp. 1-2.*
"Editor" and "text editor;" Microsoft Computer Dictionary; May 1, 2002; Microsoft Press; pp. 234 and 650.*
International Search Report for Application No. PCT/EP2010/000932 dated May 25, 2010.

* cited by examiner

METHOD AND APPARATUS FOR PHRASE REPLACEMENT

FIELD

The present application relates to a user interface, an apparatus and a method for replacing phrases in a text editor, and in particular to a user interface, an apparatus and a method for replacing phrases in a text editor through touch input.

BACKGROUND

More and more electronic apparatus such as mobile phones and Personal Digital Assistants (PDAs) are being used to input text.

Input of standard phrases is experienced by many users as a tedious task. Thus, many providers of portable apparatuses have devised input methods for replacing an abbreviation with a phrase. Using such a system the user only has to input the abbreviation and then replace the abbreviation with a phrase such as by typing a space character afterwards.

However, such methods which search for a replacement as a special character is input would make many unnecessary searches for replacements and also possibly some unwanted replacements.

An apparatus that allows fast and easy phrase replacement and only of desired phrases and abbreviations would thus be useful in modern day society.

SUMMARY

On this background, it would be advantageously to provide a user interface, an apparatus and a method that overcomes or at least reduces the drawbacks indicated above by providing an apparatus according to the claims.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which.

DETAILED DESCRIPTION

In the following detailed description, the user interface, the apparatus, the method and the software product according to the teachings for this application in the form of a cellular/mobile phone will be described by the embodiments. It should be noted that although only a mobile phone is described the teachings of this application can also be used in any electronic device such as in portable electronic devices such as laptops, PDAs, mobile communication terminals, electronic books and notepads and other electronic devices offering access to information.

Figure 1:
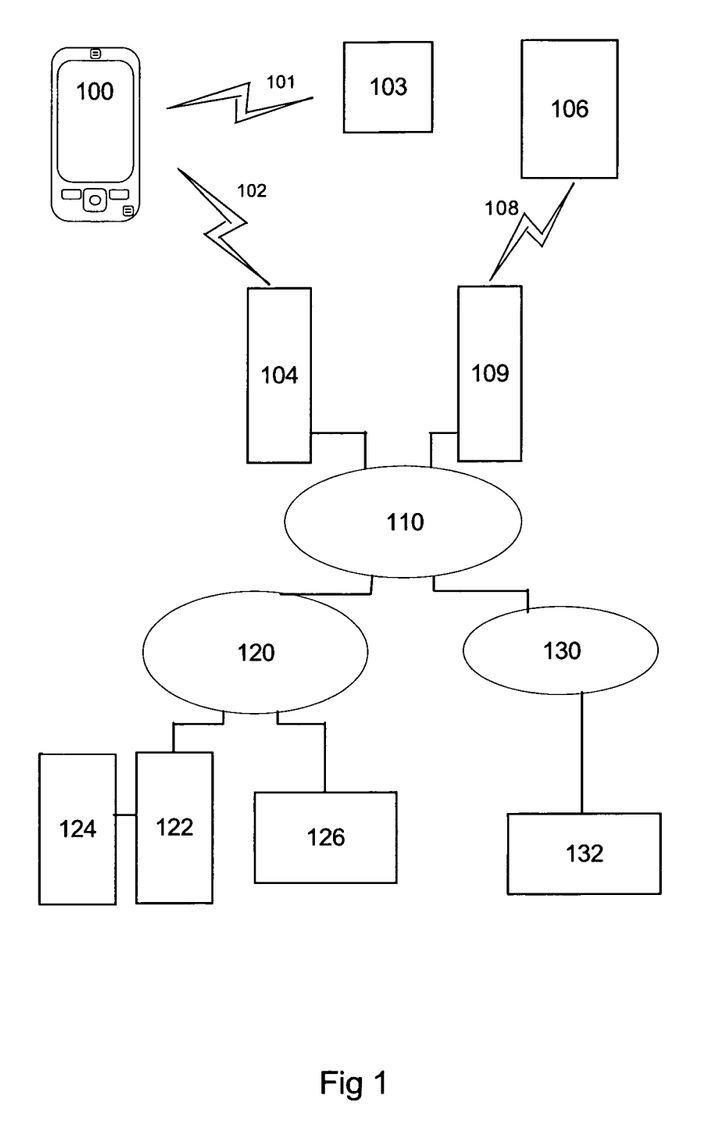
FIG. 1 is an overview of a telecommunications system in which a device according to the present application is used according to an embodiment.

FIG. 1 illustrates an example of a cellular telecommunications system in which the teachings of the present application may be applied. In the telecommunication system of FIG. 1, various telecommunications services such as cellular voice calls, www or Wireless Application Protocol (WAP) browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through Radio Frequency (RF) links 102, 108 via base stations 104, 109. The mobile telecommunications network 110 may be in compliance with any commercially available mobile telecommunications standard, such as Group Spéciale Mobile (GSM), Universal Mobile Telecommunications System (UMTS), Digital Advanced Mobile Phone system (D-AMPS), The code division multiple access standards (CDMA and CDMA2000), Freedom Of Mobile Access (FOMA), and Time Division-Synchronous Code Division Multiple Access (TD-SCDMA).

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 as is commonly known by a skilled person. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, a Radio Standard link for example an RS-232 serial link, etc. The local devices 103 can for example be various sensors that can communicate measurement values to the mobile terminal 100 over the local link 101.

A computer such as a laptop or desktop can also be connected to the network both via a radio link such as a WiFi link, which is the popular term for a radio frequency connection using the WLAN (Wireless Local Area Network) standard IEEE 802.11.

It should be noted that the teachings of this application are also capable of being utilized in an internet network of which the telecommunications network described above may be a part of.

It should be noted that even though the teachings herein are described solely to wireless networks it is in no respect to be limited to wireless networks as such, but it to be understood to be usable in the Internet or similar networks.

It should thus be understood that an apparatus according to the teachings herein may be a mobile communications terminal, such as a mobile telephone, a personal digital assistant, a laptop as well as a stationary device such as a desktop computer or a server.

Figure 2:
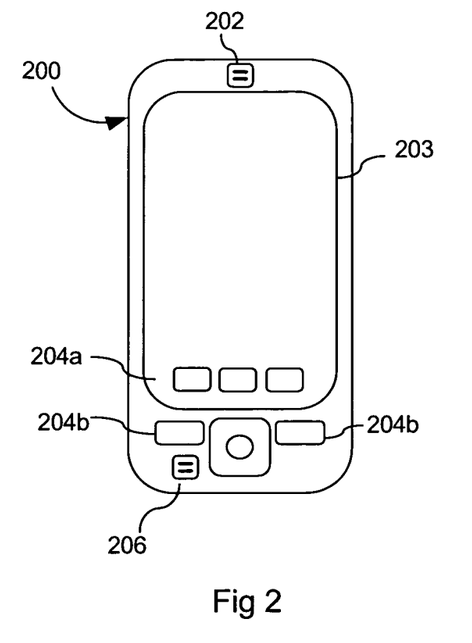
FIG. 2 is a view of an apparatus according to an embodiment.

An embodiment 200 of the mobile terminal 100 is illustrated in more detail in FIG. 2. The mobile terminal 200 comprises a speaker or earphone 202, a microphone 206, a main or first display 203 being a touch display and a set of keys 204 which may comprise both virtual 204a and physical keys 204b.

Figure 3:
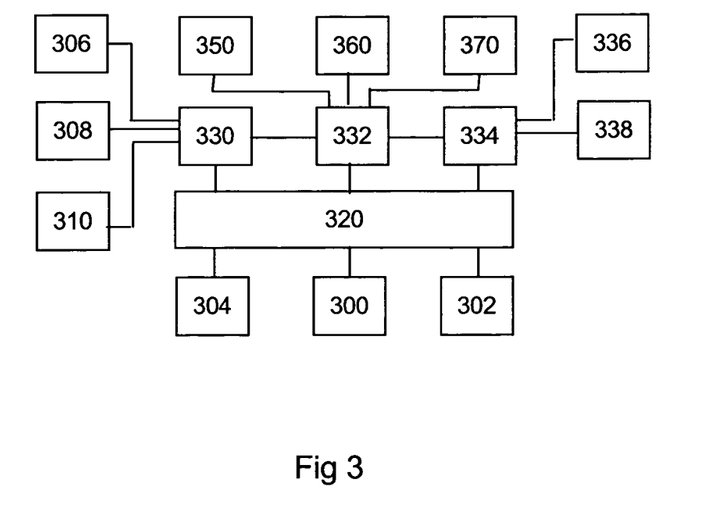
FIG. 3 is a block diagram illustrating the general architecture of an apparatus of FIG. 2 according to an embodiment, FIG. 4a, b, c and d are screen shot views of an apparatus according to an embodiment, FIG. 5a, b, c and d are screen shot views of an apparatus according to an embodiment, FIG. 6a, b, c and d are screen shot views of an apparatus according to an embodiment.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as Random Access Memory (RAM), Read Only Memory (ROM), Electrically Erasable Programmable Read-Only Memory (EEPROM), flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications. The applications can include a message text editor 350, a notepad application 360, as well as various other applications 370, such as applications for voice calling, video calling, sending and receiving messages such as Short Message Service (SMS), Multimedia Message Service (MMS) or email, web browsing, an instant messaging application, a phone book application, a calendar application, a control panel application, a camera application, one or more video games, etc. It should be noted that two or more of the applications listed above may be executed as the same application.

The MMI 334 also includes one or more hardware controllers, which together with the MMI drivers cooperate with the first touch display 336/203, and possibly a physical keypad 338/204b as well as various other Input/Output devices such as microphone, speaker, vibrator, ringtone generator, LED indicator, etc.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, Analog to Digital and Digital to Analog (AD/DA) converters, etc.

FIG. 4 shows a screen shot view of an apparatus 400 according to the teachings herein. It should be noted that such an apparatus is not limited to a mobile phone, but can be any apparatus capable of text input and receiving multi-touch input.

Figure 4A:
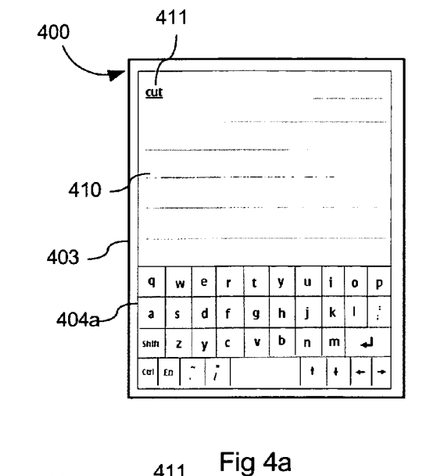

The touch display 403 comprises a virtual keypad 404a which in this embodiment is a QWERTY-style keypad and a text input area 410.

A user has previously input a string 411 which in this example reads "cut".

In this example the first string is marked which is indicated by the string being underlined.

In one embodiment a string is marked by receiving a touch input on the string.

In one such embodiment a string is marked by receiving a multi-touch input on the string.

In one embodiment the string is identified as being the string touched and extending to the enclosing space characters or punctuation marks.

In one embodiment the string is identified as being the string starting at a position of a first touch point of a multi-touch input and ending at a position of a second touch-point. As an example if a user has input the text "Hello, this is just for your information and need not be stored." and touches on the string with one finger touching on "for" and one finger touching on "information" the controller will identify the string to be "for your information".

In one embodiment a string 411 is identified trough a combination of the two identifying methods described above. In such a combination a user does not need to indicate an exact starting and ending point and the controller will parse the text string for the two words relating to the two touch points.

In one embodiment the controller is configured to parse a text string 411 starting at a point close to a first touch point of a multi-touch input and ending close to a second touch point of said multi-touch input and search a database for a matching string to use as an original string. In such an embodiment a user does not need to touch exactly on the correct starting and ending positions or word as the controller will search the database for a match. For example if a user has input the text "Hello, this is just for your information and need not be stored." and touches on the string with one finger touching on "your" and one finger touching on "information" the controller will parse the complete string and search for matches in a database finding the string "for your information" and identify the original string to be "for your information". The replacement string will then be "fyi" and the original string will be replaced by the replacement string as the user moves the two touching points closer to one another.

Figure 4B:
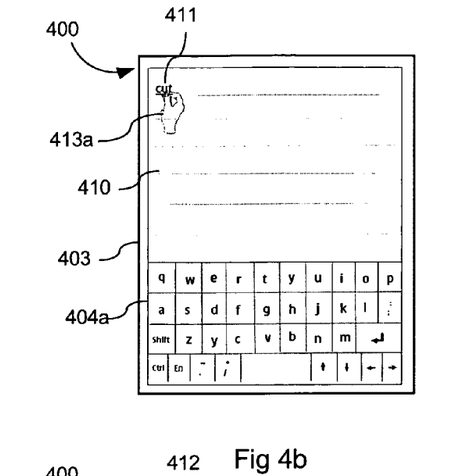

In FIG. 4b a user is touching on the string "cut" using with two fingers indicated by a closed hand 413a. A controller (not shown) is configured to receive this multi-touch and identify said string as an original string.

Figure 4C:
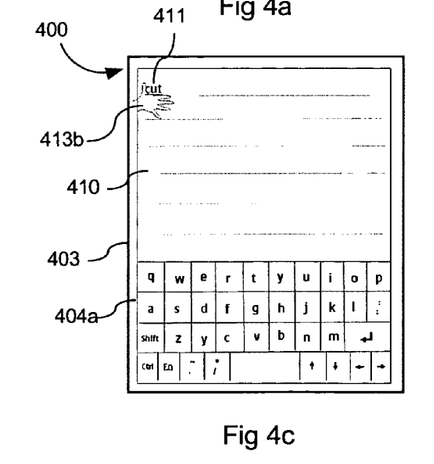

In FIG. 4c a user making a multi-touch input gesture by separating the two fingers, indicated in the figure as an open hand 413b, and the controller is configured to search a database for a matching string replacement pair to find a replacement string. If the controller finds such a pair the controller is configured to replace the original string 411 with the corresponding replacement string 412.

Figure 4D:
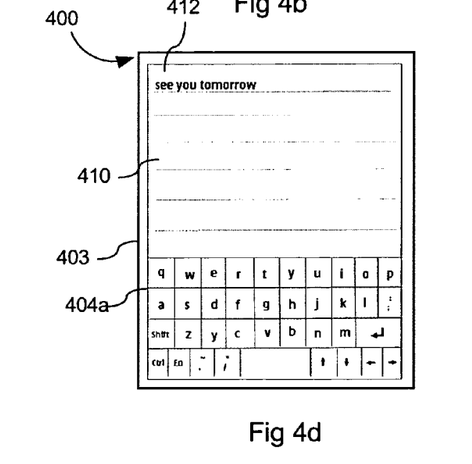

The replacement string 412 is displayed in FIG. 4d and in this example reads "see you tomorrow".

In one embodiment the controller is configured to identify an original string 411 comprising more than one word.

Figures 5A, 5B:
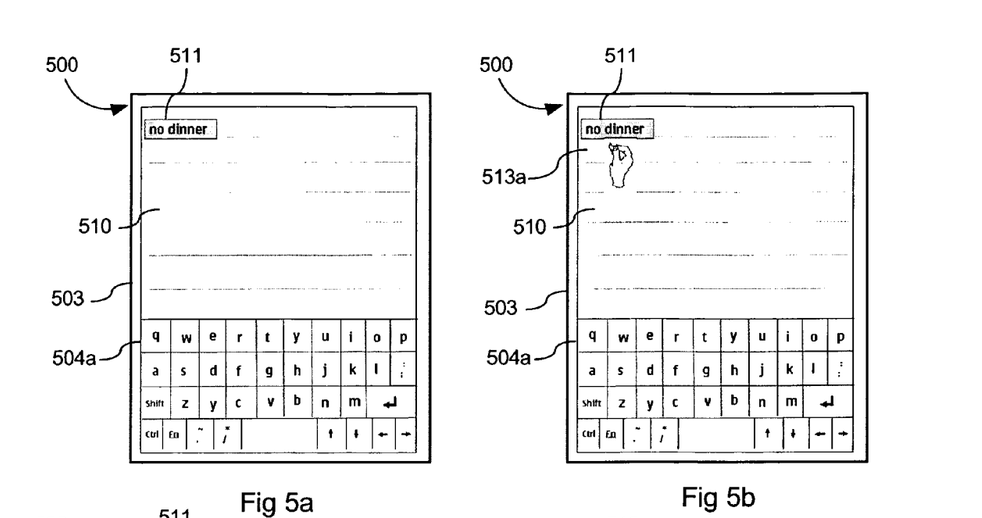
Figures 5C, 5D:
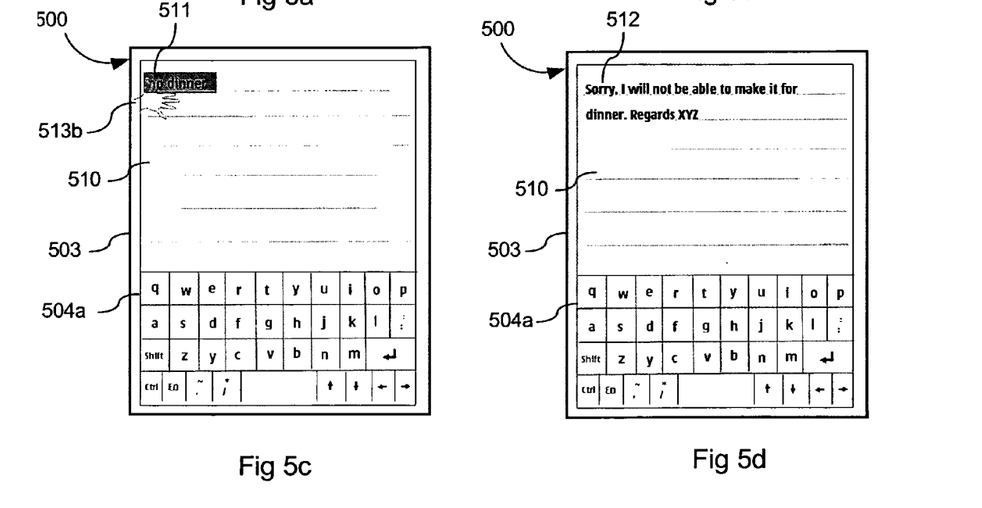

FIG. 5 shows a screen shot view of an apparatus 500 according to the teachings herein. It should be noted that such an apparatus is not limited to a mobile phone, but can be any apparatus capable of text input and receiving multi-touch input.

The touch display 503 comprises a virtual keypad 504*a* which in this embodiment is a QWERTY-style keypad and a text input area 510. It should be noted that other keypads such as AZERTY are possible and sometimes preferred depending on the input language or the region of use.

In one embodiment the virtual keypad is a virtual ITU-T type keypad.

In FIG. 5*a* a user has input a string 511 which in this example read "no dinner".

In this example a database comprise a replacement string pair comprising the two strings "no dinner" and "Sorry, I will not be able to make it for dinner. Regards XYZ"

FIG. 5*b* shows a display shot view of a user touching on the string 511 with two fingers, indicated in the figure as a closed hand 513*a*. A controller is configured to receive the multi-touch input and identify the string 511 as an original string 511.

In this example the original string is marked by being highlighted. As has already discussed above other markings exists. Examples of markings are underlining, framing, inverting colors and using different colors.

In FIG. 5*c* a user performs a multipoint gesture wherein he separates his two fingers, indicated in the figure as an open hand 513*b*. A controller is configured to receive the multi-touch gesture and to replace the original string with the replacement string found in the database.

The replacement string 512 is displayed in the text area 510 in FIG. 5*d*.

In the embodiments above the original string has a shorter length than the replacement string. This provides a user with a possibility to input a long phrase by inputting a shorter abbreviation and to replace them. In the embodiments below the original string will have a longer length than the replacement string.

It should be noted that the term replacement string and original string are used intermittently to refer to both the abbreviation and the phrase as the teachings herein disclose to both replace with a shorter string and to replace with a longer string.

This can be used to replace a phrase with an abbreviation to save space in limited length messages such as text messages using the commonly known Short Message Service protocol (an SMS).

FIG. 6 shows a screen shot view of an apparatus 600 according to the teachings herein. It should be noted that such an apparatus is not limited to a mobile phone, but can be any apparatus capable of text input and receiving multi-touch input.

Figure 6A:
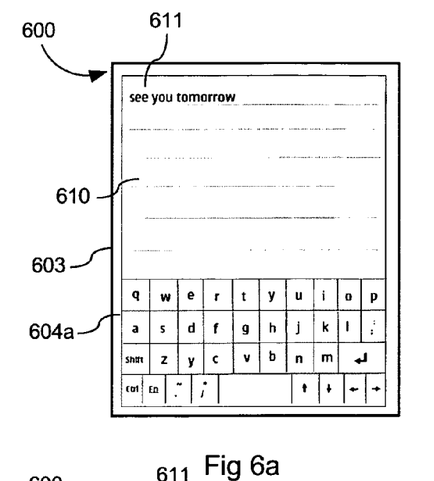

The touch display 603 comprises a virtual keypad 604*a* which in this embodiment is a QWERTY-style keypad and a text input area 610.

In FIG. 6*a* a user has input a string 611 which in this example read "see you tomorrow".

In this example it is assumed that a user has exceeded the available length of a message to be sent. One such example could be if the user has input more text which is not shown having a length of 150 characters so that the total text length exceeds 160 characters which is the limit for an SMS message.

To be able to send the message the user needs to shorten the text.

Figure 6B:
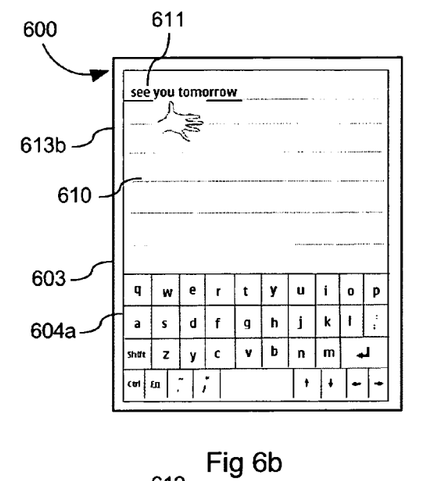

FIG. 6*b* shows a display shot view where a user is performing a multi-touch on the string 611 "see you tomorrow", indicated in the figure as an open hand 613*b*. It should be noted that the distance between the two fingers are noted by a controller and is considerable compared to the size of a character. The controller is configured to receive the multi-touch input and to identify the original string in response thereto. The identification is performed in one of the manners which are described with reference to FIG. 4.

Figure 6C:
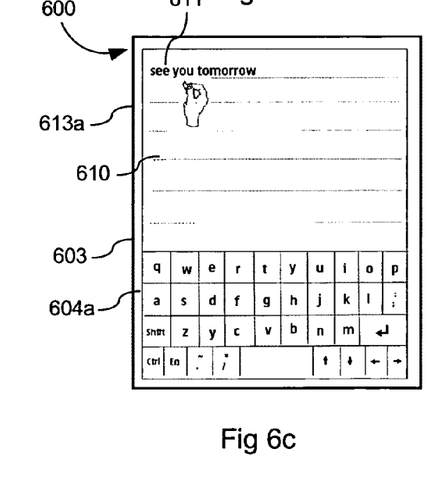

In FIG. 6*c* a user performs a multi-touch gesture where he moves his fingers closer together, indicated in the figure as a closed hand 613*a*. The controller is configured to receive this multi-touch input gesture and to search a database for a matching string replacement pair and if one is found to replace the original string with a replacement string 512.

Figure 6D:
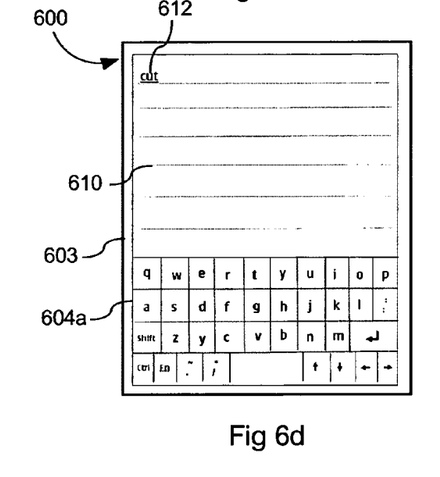

In this example the replacement string is "cut" and is displayed by the controller on the text input area 610 in FIG. 6*d*.

Working under the assumption above the total length of the text is now 153 characters and the user is able to send the text as an SMS message using the SMS protocol.

In one embodiment where a matching string replacement pair is not found the controller is configured to parse the original string for partial strings. Partial strings are strings which are separated by separating characters such as space characters and possibly punctuation characters. In the example given with reference to FIG. 6 the partial strings are "see", "you" and "tomorrow".

The controller is further configured to parse the partial strings for the initial letters which in this example are 's', 'y' and 't' and store these in a new string which in this example becomes "syt".

The controller is configured to replace the original phrase with the newly created string.

The controller is further configured to create a new string replacement pair comprising the strings "syt" and "see you tomorrow" and stores them in the database.

The controller is further configured to receive an input representing an acceptance from a user to store the newly created replacement pair.

In one embodiment the controller is further configured to provide a text editor for editing the newly created replacement string and to store the edited replacement string as part of the newly created string replacement pair. In such an embodiment a user would be offered a possibility to edit the replacement string "syt" before storing it to a more appropriate form such as "cut" which is more in line with the short text colloquial commonly used.

In one embodiment a controller is configured to match an original string to a replacement pair by doing partial matches. This is likely to produce more than one matching replacement string.

In one embodiment a controller is configured to select the replacement string that corresponds to an original string which was the best match.

In one such embodiment a controller is further configured to display a list of possible replacement strings for user selection.

In one exemplary embodiment a user has stored two replacement string pairs: <"in meeting"; "I am in a meeting right now, please contact my assistant"> and <"meeting call"; "I'm in a meeting right now, but will call you back later">. A user types in the word "meeting" and marks it for expansion with a replacement phrase as has been described above. As the controller tries to replace the string "meeting" two possible replacement strings are found as the string "meeting" will partially match both "in meeting" and "meeting call". These two replacement strings are displayed to a user which then selects one of them. The selection can be made by touching on the wanted replacement string. In this example the two strings: "I am in a meeting right now, please contact my assistant" and "I'm in a meeting right now, but will call you back later" are displayed.

In one embodiment a controller is configured to display a portion of the replacement string found. This enables displaying more strings when the strings are long. In this example the two strings could be displayed as: ". . . meeting right now, but will call . . . " and ". . . meeting right now, please contact . . . ".

In these examples both the start and the ends have been truncated. In one embodiment only the end is truncated. In one embodiment only key words are displayed. In one embodiment key words are nouns. In one embodiment key words are verbs.

In one exemplary embodiment the two replacements strings are displayed as ". . . meeting . . . call . . . " and ". . . meeting . . . assistant . . . ".

Figure 7:
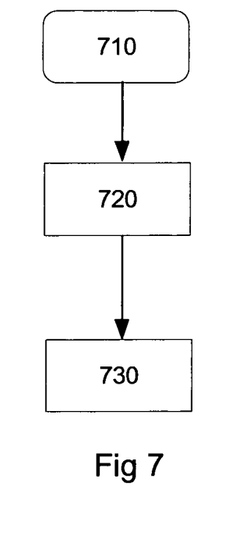
FIG. 7 is a flow chart describing a method according to an embodiment of the application.

FIG. 7 shows a flow chart of a method according to a method as disclosed herein. In a first step 710 an original string is identified. In a second step a multi-touch gesture is received and in a third step the original string is replaced by a corresponding replacement string in response to the received multi-touch input received in step 720.

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal digital Assistants (PDAs), game consoles, media players, personal organizers, computers or any other device designed for text input.

The teaching of the present application has numerous advantages. Different embodiments or implementations may yield one or more of the following advantages. It should be noted that this is not an exhaustive list and there may be other advantages which are not described herein. For example, one advantage of the teaching of this application is that a user is provided with a manner to quickly and easily input commonly used phrases.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone, it should be appreciated that the teachings of the present application may also be applied to other types of electronic devices, such as media players, palmtop, laptop and desktop computers and the like. It should also be noted that there are many alternative ways of implementing the methods and apparatuses of the teachings of the present application.

Features described in the preceding description may be used in combinations other than the combinations explicitly described.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. A method comprising:
    storing a plurality of string replacement pairs in a database, the string replacement pairs each comprising a key string and replacement string;
    receiving a touch input comprising at least a first and second touch point identifying a user-provided original string displayed between the first and second touch points, wherein the touch input and the user-provided original string are provided via a text editor application;
    receiving an indication of a request to replace the user-provided original string in response to receiving an input gesture via the text editor application, the input gesture comprising changing a distance between the first and second touch points;
    in response to the input gesture, searching said database for a matching string replacement pair, wherein said matching compares said user-provided original string the key string of a particular string replacement pair of the plurality of string replacement pairs;
    identifying an intended replacement string for the user-provided original string based on the corresponding replacement string of the matched particular string replacement pair; and
    replacing the user-provided original string in the text editor application with the intended replacement string.

2. A method according to claim 1, wherein said user-provided original string comprises at least two partial strings which are separated by a space character and wherein said method further comprises:
    parsing said user-provided original string for initial letters of said partial strings;
    generating a new string comprising the initial letters; and
    identifying said intended replacement string based on the new string.

3. A method according to claim 2 further comprising storing said new string and said user-provided original string as a string replacement pair.

4. A method according to claim 1 further comprising:
    storing said user-provided original string and said intended replacement string as a string replacement pair in said database; and
    searching said database for a matching string replacement pair using said user-provided original string as a search key.

5. The method according to claim 1, wherein identifying the intended replacement string for the user-provided original string comprises:
    identifying a plurality of potential replacement strings;
    causing display of the plurality of potential replacement strings; and
    receiving indication of a selection of one of the plurality of potential replacement strings.

6. The method according to claim 1, further comprising:
    after replacing the user-provided original string in the text editor application with the intended replacement string, receiving an indication to edit the intended replacement string in the text editor application; and
    storing a newly created replacement string for subsequent retrieval and in association with the user-provided original string based on the indication to edit the intended replacement string in the text editor.

7. An apparatus comprising at least one processor, and at least one memory including a computer program code, the at least one memory and the computer program code configured to, with the at least one processor, cause the apparatus at least to,  store a plurality of string replacement pairs in a database, the string replacement pairs each comprising a key string and replacement string;

receive a touch input comprising at least a first and second touch point identifying a user-provided original string displayed between the first and second touch points, wherein the touch input and the user-provided original string are provided via a text editor application;

receive an indication of a request to replace the user-provided original string in response to receiving an input gesture via the text editor application, the input gesture comprising changing a distance between the first and second touch points;

in response to the input gesture, search said database for a matching string replacement pair, wherein said matching compares said user-provided original string the key string of a particular string replacement pair of the plurality of string replacement pairs;

identify an intended replacement string for the user-provided original string based on the corresponding replacement string of the matched particular string replacement pair; and  replace the user-provided original string in the text editor application with the intended replacement string.

8. An apparatus according to claim 1, wherein said user-provided original string comprises at least two partial strings which are separated by at least a space character and wherein the computer program code is further configured to, with the at least one processor, cause the apparatus to:

parse said user-provided original string for initial letters of said partial strings;

generate a new string comprising the initial letters; and identify said intended replacement string based on the new string.

9. An apparatus according to claim 8, wherein the computer program code is further configured to, with the at least one processor, cause the apparatus to:

store said new string and said user-provided original string as a string replacement pair.

10. An apparatus according to claim 7, wherein the computer program code is further configured to, with the at least one processor, cause the apparatus to:

store the user-provided original string and said intended replacement string as a string replacement pair in said database; and  search said database for a matching string replacement pair using said user-provided original string as a search key.

11. The apparatus of claim 7, wherein the user-provided original word is an abbreviation of the intended replacement string.

12. The apparatus of claim 7, wherein the intended replacement string for the user-provided original string is identified based on an association of the user-provided original string and the intended replacement string.

13. A computer program product comprising at least one non-transitory computer readable medium having computer-executable program code instructions stored therein, the computer-executable program code instructions comprising program code instructions to:

store a plurality of string replacement pairs in a database, the string replacement pairs each comprising a key string and replacement string;

receive a touch input comprising at least a first and second touch point identifying a user-provided original string displayed between the first and second touch points, wherein the touch input and the user-provided original string are provided via a text editor application;

receive an indication of a request to replace the user-provided original string in response to receiving an input gesture via the text editor application, the input gesture comprising changing a distance between the first and second touch points;

in response to the input gesture, search said database for a matching string replacement pair, wherein said matching compares said user-provided original string the key string of a particular string replacement pair of the plurality of string replacement pairs;

identify an intended replacement string for the user-provided original string based on the corresponding replacement string of the matched particular string replacement pair; and  replace the user-provided original string in the text editor application with the intended replacement string.

\* \* \* \* \*

UNITED STATES PATENT AND TRADEMARK OFFICE
CERTIFICATE OF CORRECTION

| | |
|---|---|
| PATENT NO. | : 8,996,995 B2 |
| APPLICATION NO. | : 13/203308 |
| DATED | : March 31, 2015 |
| INVENTOR(S) | : Ramachandra |

It is certified that error appears in the above-identified patent and that said Letters Patent is hereby corrected as shown below:

In the claims:

<u>Column 9,</u>
Line 28, "claim 1" should read --claim 7--.

Signed and Sealed this
Eighth Day of December, 2015

Michelle K. Lee
*Director of the United States Patent and Trademark Office*